United States Patent
Bae et al.

(10) Patent No.: US 9,264,633 B2
(45) Date of Patent: Feb. 16, 2016

(54) IMAGE SENSOR AND COMPUTING SYSTEM HAVING THE SAME

(71) Applicant: SAMSUNG ELECTRONICS CO., LTD., Suwon-si, Gyeonggi-do (KR)

(72) Inventors: Hyung-Jin Bae, Suwon-si (KR); Kyoung-Hoon Yang, Daejeon (KR); Ji-Won Lee, Daejeon (KR); Eun-Sub Shim, Anyang-si (KR); Moo-Sup Lim, Yongin-si (KR)

(73) Assignee: SAMSUNG ELECTRONICS CO., LTD., Suwon-si, Gyeonggi-do (KR)

( * ) Notice: Subject to any disclaimer, the term of this patent is extended or adjusted under 35 U.S.C. 154(b) by 0 days.

(21) Appl. No.: 14/221,692

(22) Filed: Mar. 21, 2014

(65) Prior Publication Data

US 2014/0313416 A1    Oct. 23, 2014

(30) Foreign Application Priority Data

Apr. 22, 2013 (KR) .................. 10-2013-0044315

(51) Int. Cl.
*H04N 5/355* (2011.01)
*H04N 5/365* (2011.01)

(52) U.S. Cl.
CPC ........... *H04N 5/355* (2013.01); *H04N 5/35545* (2013.01); *H04N 5/365* (2013.01)

(58) Field of Classification Search
CPC ....... H04N 5/367; H04N 5/365; H04N 5/355; H04N 5/35545; H01L 27/14603
See application file for complete search history.

(56) References Cited

U.S. PATENT DOCUMENTS

| | | | |
|---|---|---|---|
| 7,009,649 B2 | 3/2006 | Watanabe | |
| 7,205,522 B2 * | 4/2007 | Krymski | H04N 5/3653 250/208.1 |
| 7,880,778 B2 | 2/2011 | Kamon | |
| 7,935,918 B2 | 5/2011 | Mheen et al. | |
| 8,222,709 B2 | 7/2012 | Oike et al. | |
| 8,223,240 B2 * | 7/2012 | Kusuda | H04N 3/1568 348/302 |
| 9,001,245 B2 * | 4/2015 | Wang | H01L 27/14603 348/297 |
| 2006/0261246 A1 * | 11/2006 | Krymski | 250/208.1 |
| 2008/0252742 A1 | 10/2008 | Oike | |
| 2008/0303928 A1 * | 12/2008 | Kusuda | 348/300 |
| 2011/0013065 A1 | 1/2011 | Shinohara | |
| 2012/0002089 A1 * | 1/2012 | Wang et al. | 348/297 |

FOREIGN PATENT DOCUMENTS

| | | |
|---|---|---|
| JP | 2006-303768 | 11/2006 |
| JP | 2008-099158 | 4/2008 |
| JP | 2012-049792 | 3/2012 |
| JP | 2012-124835 | 6/2012 |

* cited by examiner

*Primary Examiner* — Ahmed A Berhan
(74) *Attorney, Agent, or Firm* — Lee & Morse, P.C.

(57) ABSTRACT

An image sensor includes a light-electron conversion unit, a signal generation unit, and a selection unit. The light-electron conversion unit generates photo-charges from incident light. The signal generation unit accumulates photo-charges from the converter in a storage node during a detection period, and then generates a first analog signal and a second analog signal during an output period. The analog signals are generated based on an amount of photo-charges accumulated in the storage node. The selection unit generates an image signal based on one of the first analog signal and the second analog signal.

20 Claims, 14 Drawing Sheets

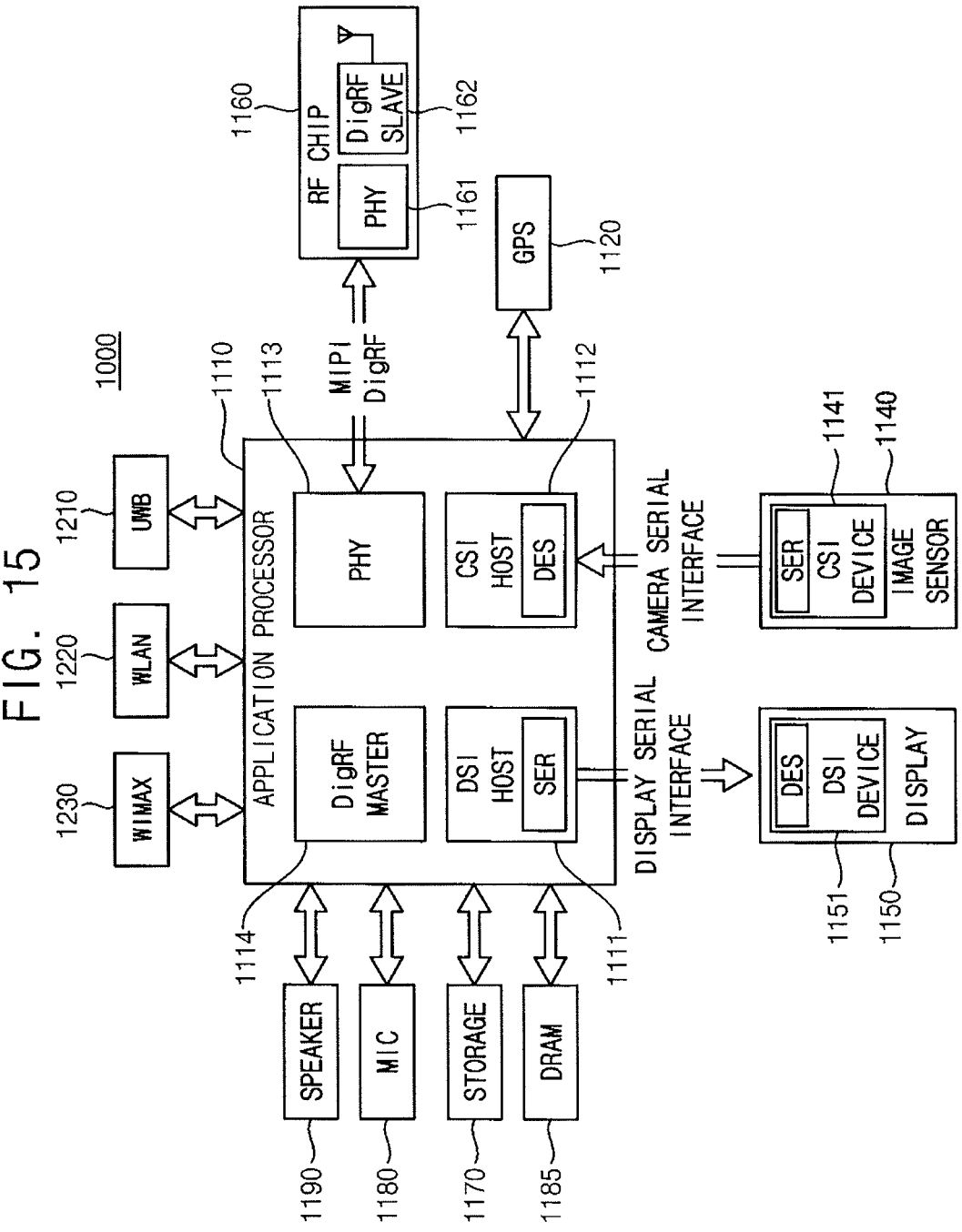

IMAGE SENSOR AND COMPUTING SYSTEM HAVING THE SAME

CROSS-REFERENCE TO RELATED APPLICATION

Korean Patent Application No. 10-2013-0044315, filed on Apr. 22, 2013, and entitled "Image Sensor and Computing System Having The Same," is incorporated by reference herein in its entirety.

BACKGROUND

1. Field

One or more embodiments described herein relate to an image sensor.

2. Description of the Related Art

Generally, analog signals outputted from unit pixels of an image sensor vary for a same incident light due to the respective characteristics of each pixel. This variation is referred to as a fixed pattern noise (FPN). FPN may reduce the quality of an image output from the image sensor.

SUMMARY

In accordance with one embodiment, an image sensor includes a light-electron conversion unit, a signal generation unit, and a selection unit. The light-electron conversion unit generates photo-charges from incident light. The signal generation unit accumulates, during a detection period, the photo-charges from the light-electron conversion unit in a storage node during a detection period, and to generate a first analog signal and a second analog signal based on a first transmission control signal and a second transmission control signal, respectively, during an output period. The selection unit generates an image signal based on one of the first analog signal or the second analog signal, wherein the first analog signal and the second analog signal are generated based on an amount of the photo-charges accumulated in the storage node and wherein the second transmission control signal is applied after the first transmission control signal.

The first transmission control signal may be activated to a first voltage, and the second transmission control signal may be activated to a second voltage greater than the first voltage. The signal generation unit may generate the first analog signal based on a partial amount of the photo-charges accumulated in the storage node in response to the first transmission control signal, and generate the second analog signal based on a total amount of the photo-charges accumulated in the storage node in response to the second transmission control signal.

The signal generation unit may include a transmission transistor including a source coupled to the storage node, a drain coupled to a floating diffusion node, and a gate coupled to receive the first transmission control signal and the second transmission control signal; a reset transistor including a source coupled to the floating diffusion node, a drain coupled to a supply voltage, and a gate receiving a reset control signal; a sensing transistor including a source, a drain coupled to the supply voltage, and a gate coupled to the floating diffusion node; and a row selection transistor including a drain coupled to the source of the sensing transistor, a gate receiving a row selection signal, and a source outputting the first analog signal and the second analog signal.

The reset control signal may be activated and the reset transistor may be turned on to reset the floating diffusion node, the floating diffusion node reset by discharging the photo-charges stored in the floating diffusion node to the supply voltage during the detection period, and the reset control signal may be deactivated and the reset transistor may be turned off during the output period.

During the output period, the transmission transistor may turn on at a first strength in response to the first transmission control signal to transfer a portion of the photo-charges accumulated in the storage node to the floating diffusion node, and wherein the transmission transistor may turn on at a second strength in response to the second transmission control signal to transfer a remaining portion of the photo-charges in the storage node to the floating diffusion node, and wherein the second strength is greater than the first strength.

During the output period, the sensing transistor may generate an output signal based on a voltage of the floating diffusion node and the row selection transistor may turn on in response to the row selection signal to pass the output signal.

The row selection transistor may turn on during the output period to output the first analog signal having a magnitude corresponding to an amount of the photo-charges stored in the floating diffusion node after the first transmission control signal is activated, and the row selection transistor outputs the second analog signal having a magnitude corresponding to an amount of the photo-charges stored in the floating diffusion node after the second transmission control signal is activated.

The selection unit may output the second analog signal as the image signal when the second analog signal is smaller than or equal to a reference signal, and output a sum of the first analog signal and an offset signal as the image signal when the second analog signal is greater than the reference signal.

A magnitude of the offset signal may correspond to a magnitude of the second analog signal at a time when the first analog signal starts to increase as an intensity of the incident light increases.

The selection unit may include a first latch unit configured to latch the first analog signal in response to a first latch control signal, a second latch unit configured to latch the second analog signal in response to a second latch control signal, a summing unit configured to generate a sum signal by adding an output signal of the first latch unit and an offset signal, a comparison unit configured to generate a comparison signal having a first logic level when an output signal of the second latch unit is less than or equal to a reference signal, and to generate the comparison signal having a second logic level when the output signal of the second latch unit is greater than the reference signal, and a multiplexer configured to output the output signal of the second latch unit as the image signal when the comparison signal has the first logic level, and to output the sum signal as the image signal when the comparison signal has the second logic level.

The selection unit may output the second analog signal as the image signal when the second analog signal is less than or equal to a sum of the first analog signal and an offset signal, and the sum of the first analog signal and the offset signal as the image signal when the second analog signal is greater than the sum of the first analog signal and the offset signal.

The selection unit may include a first latch unit configured to latch the first analog signal in response to a first latch control signal, a second latch unit configured to latch the second analog signal in response to a second latch control signal, a summing unit configured to generate a sum signal by adding an output signal of the first latch unit and an offset signal, and a multiplexer configured to output a smaller of an output signal of the second latch unit and the sum signal as the image signal.

The image sensor may further include an analog-to-digital conversion unit configured to convert the image signal to a digital signal, and a control unit configured to control operations of the signal generation unit, the selection unit and the analog-to-digital conversion unit.

In accordance with another embodiment, a computing system includes an image sensor, a storage unit and a processor. The image sensor generates a digital signal based on incident light. The storage unit stores the digital signal. The processor controls operations of the image sensor and the storage unit. The image sensor includes a light-electron conversion unit, a signal generation unit, a selection unit and an analog-digital conversion unit. The light-electron conversion unit generates photo-charges in response to the incident light. The signal generation unit accumulates, during a detection period, the photo-charges generated from the light-electron conversion unit in a storage node during a detection period, and generates a first analog signal and a second analog signal in response to a first transmission control signal and a second transmission control signal, respectively, during an output period. The selection unit generates an image signal based on one of the first analog signal or the second analog signal. The analog-to-digital converter converts the image signal to the digital signal, wherein the first analog signal and the second analog signal are generated based on amounts of the photo-charges accumulated in the storage node, and wherein the second transmission control signal is applied or activated before first transmission control signal.

In accordance with another embodiment, an image sensor includes a converter to generate photo-charges from incident light; a storage node to accumulate a first amount of the photo-charges during a first period and a second amount of the photo-charges during a second period; a floating diffusion node to receive the photo-charges accumulated in the storage node; and a selector to generate an image signal based on a first analog signal and a second analog signal, the first analog signal generated based on a first amount of photo-charges transferred from the storage node to the floating diffusion node during the first period, and the second analog signal generated based on a second amount of photo-charges transferred from the storage node to the floating diffusion node during the second period, wherein the first amount of photo-charges are accumulated in the storage node when illumination is at a first rate and the second amount of photo-charges are accumulated in the storage node when illumination is at a second rate.

The second rate may be greater than the first rate. The first rate may be a linear rate and the second rate may be a logarithmic rate.

The image sensor may include a transmission switch, wherein the first amount of photo-charges are accumulated in the storage node when the transmission switch is operating at a first strength and the second amount of photo-charges are accumulated in the storage node when the transmission switch is operating at a second strength different from the first strength. The second strength may be greater than the first strength.

BRIEF DESCRIPTION OF THE DRAWINGS

Features will become apparent to those of ordinary skill in the art by describing in detail exemplary embodiments with reference to the attached drawings in which:

FIG. 15 illustrates an example of an interface in the computing system.

DETAILED DESCRIPTION

Figure 1:
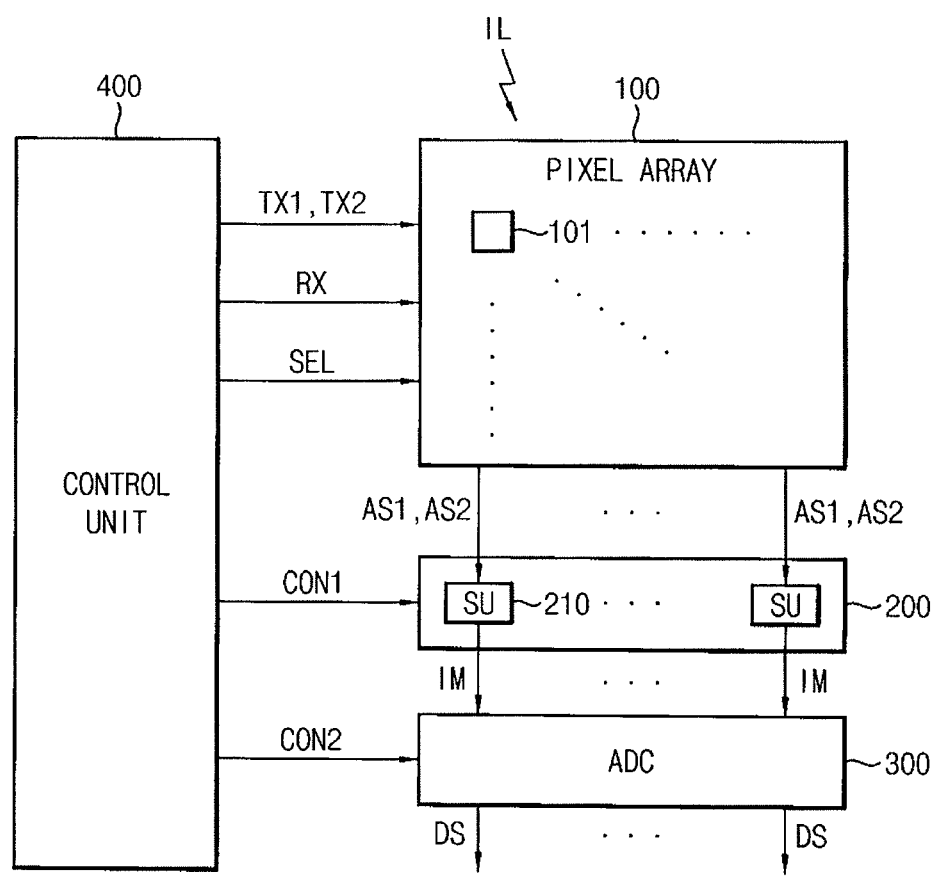
FIG. 1 illustrates an embodiment of an image sensor.

Example embodiments are described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

FIG. 1 illustrates an embodiment of an image sensor 10 which includes a pixel array 100, a selection circuit 200, an analog-digital conversion unit ADC 300, and a control unit 400.

The pixel array 100 includes a plurality of unit pixels 101 arranged in columns and rows. Each of the unit pixels 101 detects incident light IL and generates a first analog signal AS1 and a second analog signal AS2 in response to the incident light IL.

The control unit 400 provides the pixel array 100 with a first transmission control signal TX1, a second transmission control signal TX2, a reset control signal RX, and a row selection signal SEL to control the operation of the pixel array 100, for example, in units of rows. Each of the unit pixels 101 generates the first analog signal AS1 and the second analog signal AS2, which represent an image according to the incident light IL, in response to the first transmission control signal TX1 and the second transmission control signal TX2, respectively. The first and second transmission control signals TX1 and TX2 may be activated consecutively.

The control unit 400 may activate the first transmission control signal TX1 to a first voltage, and activate the second transmission control signal TX2 to a second voltage higher than the first voltage. Each of the unit pixels 101 may generate the first analog signal AS1 in response to the first transmission control signal TX1 activated to the first voltage, and may generate the second analog signal AS2 (which, for example, may be greater than the first analog signal AS1) in response to the second transmission control signal TX2 activated to the second voltage.

The selection circuit 200 includes a plurality of selection units SU 210 coupled to respective columns of the pixel array 100. Each of the selection units 210 generate an image signal IM based on one of the first analog signal AS1 and the second analog signal AS2 provided from a respective column of the pixel array 100.

The analog-digital conversion unit 300 converts the image signal IM provided from the selection circuit 200 to a digital signal DS. In some example embodiments, the analog-digital conversion unit 300 may generate the digital signal DS by performing a single slope analog-digital conversion on the image signal IM. In other example embodiments, the analog-digital conversion unit 300 may generate the digital signal DS by performing a sigma-delta analog-digital conversion on the image signal IM. According to example embodiments, the analog-digital conversion unit 300 may generate the digital signal DS by performing various kinds of analog-digital conversions on the image signal IM.

The control unit 400 controls operation of the pixel array 100 using the first transmission control signal TX1, the second transmission control signal TX2, the reset control signal RX, and the row selection signal SEL. The control unit 400 also controls operation of the selection units 210 using a first control signal CON1, and controls operation of the analog-digital conversion unit 300 using a second control signal CON2.

Figure 2:
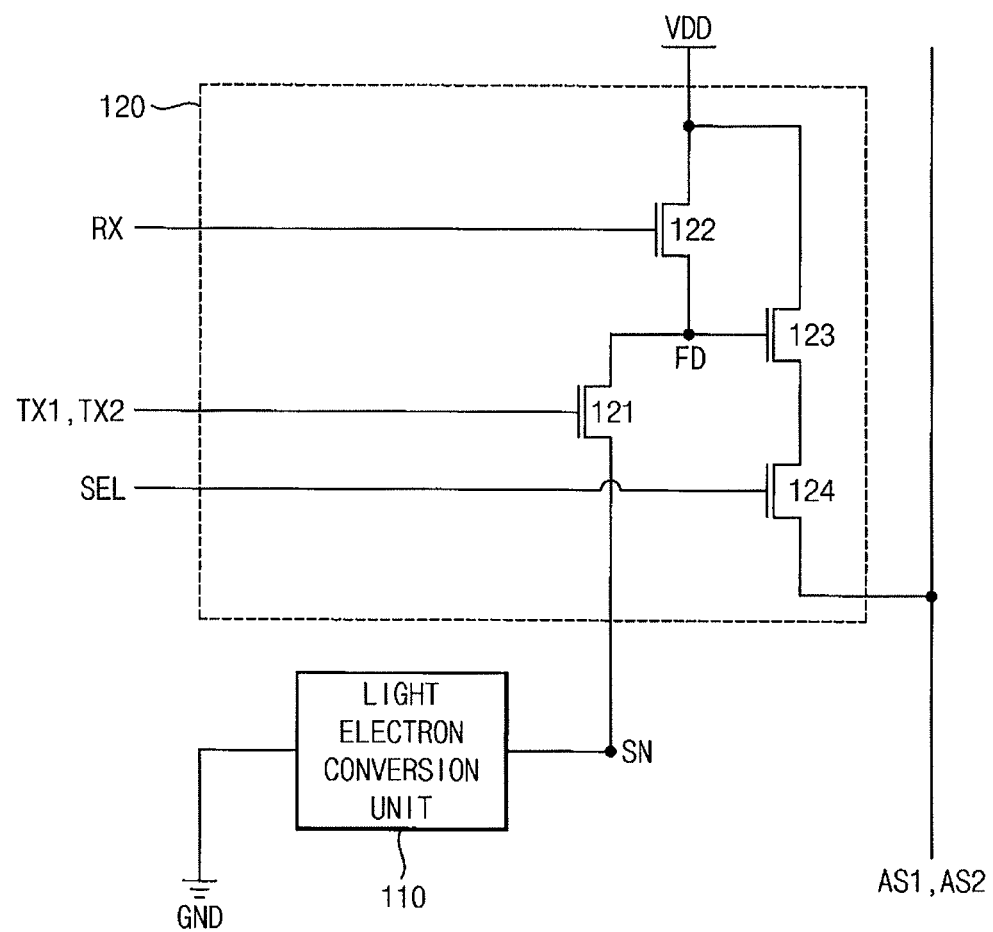
FIG. 2 illustrates an example of a unit pixel in the image sensor.

FIG. 2 illustrates an example of a unit pixel which may be included in the image sensor of FIG. 1. Referring to FIG. 2, the unit pixel 101 includes a light-electron conversion unit 110 and a signal generation unit 120.

The light-electron conversion unit 110 generates photo-charges in response to the incident light IL. In some example embodiments, the light-electron conversion unit 110 may include a photodiode.

The signal generation unit 120 is coupled between the light-electron conversion unit 110 and a supply voltage VDD. During a detection period, the signal generation unit 120 accumulates the photo-charges generated from the light-electron conversion unit 110 in a storage node SN. During an output period, the signal generation unit 120 generates the first analog signal AS1 and the second analog signal AS2 in response to the first transmission control signal TX1 and the second transmission control signal TX2, respectively, which are activated consecutively, based on an amount of the photo-charges accumulated in the storage node SN.

In some example embodiments, the first transmission control signal TX1 may be activated to the first voltage, and the second transmission control signal TX2 may be activated to the second voltage higher than the first voltage. In this case, the signal generation unit 120 may generate the first analog signal AS1 based on a partial amount of the photo-charges accumulated in the storage node SN in response to the first transmission control signal TX1 activated to the first voltage.

The signal generation unit 120 may generate the second analog signal AS2 based on a total amount of the photo-charges accumulated in the storage node SN in response to the second transmission control signal TX2 activated to the second voltage. Therefore, a magnitude of the second analog signal AS2 may be greater than a magnitude of the first analog signal AS1.

As illustrated in FIG. 2, the signal generation unit 120 may include a transmission transistor 121, a reset transistor 122, a sensing transistor 123, and a row selection transistor 124.

The transmission transistor 121 may include a source, a drain, and a gate. The source corresponds to the storage node SN storing the photo-charges provided from the light-electron conversion unit 110. The drain corresponds to a floating diffusion node FD. The gate receives the first transmission control signal TX1 and the second transmission control signal TX2. The threshold voltages of the transmission transistors 121 in the unit pixels 101 may vary, for example, based on their manufacturing processes. As a result, the threshold voltages of the transmission transistors 121 in the unit pixels 101 may be different from each other.

The reset transistor 122 may include a source coupled to the floating diffusion node FD, a drain coupled to the supply voltage VDD, and a gate receiving the reset control signal RX.

The sensing transistor 123 may include a source coupled to a drain of the row selection transistor 124, a drain coupled to the supply voltage VDD, and a gate coupled to the floating diffusion node FD.

The row selection transistor 124 may include a drain coupled to the source of the sensing transistor 123, a gate receiving the row selection signal SEL, and a source outputting the first analog signal AS1 and the second analog signal AS2.

Figure 3:
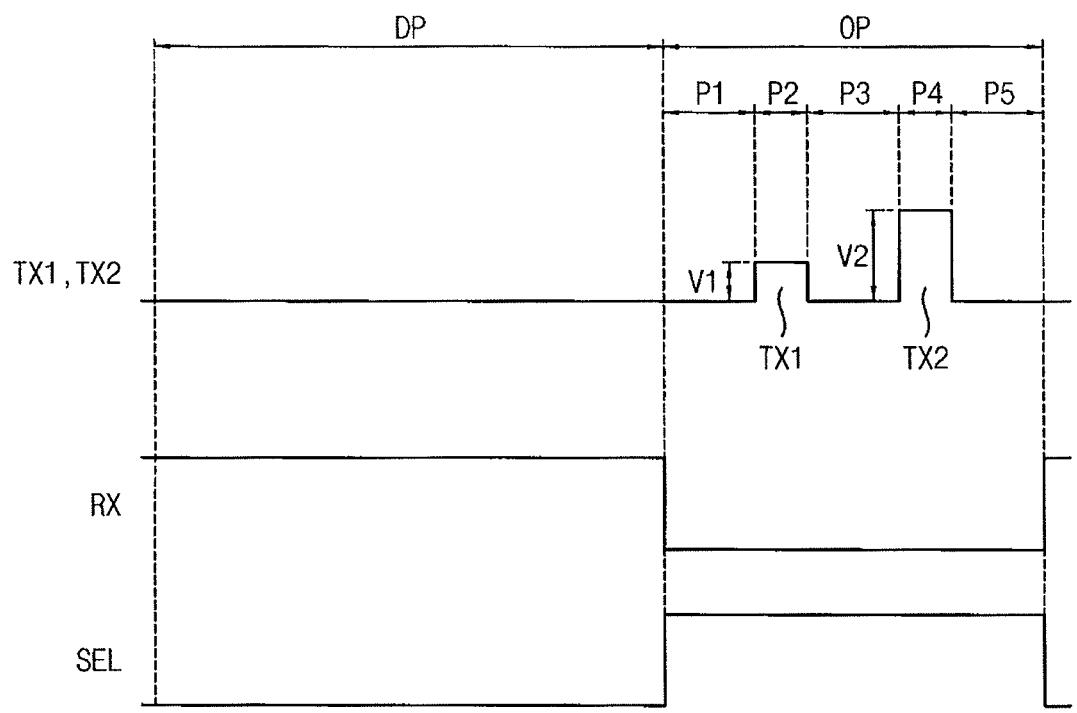
FIG. 3 illustrates a timing diagram for signals provided from a control unit to a unit pixel of the image sensor.

FIG. 3 illustrates an example of a timing diagram of a first transmission control signal, a second transmission control signal, a reset signal, and a selection signal that are provided from a control unit in an image sensor such as shown in FIG. 1 to a unit pixel such as shown in FIG. 2.

As illustrated in FIG. 3, one cycle of the unit pixel 101 may be divided into the detection period DP and the output period OP. The detection period DP and the output period OP may be determined based on a logic level of the row selection signal SEL provided from the control unit 400. That is, the row selection signal SEL may be in a logic low level during the detection period DP and may be in a logic high level during the output period OP.

During the detection period DP, the control unit 400 may provide the row selection signal SEL having a deactivated state to the gate of the row selection transistor 124 provide the reset control signal RX having an activated state to the gate of the reset transistor 122, and provide the first transmission control signal TX1 and the second transmission control signal TX2 having a deactivated state to the gate of the transmission transistor 121. The activated state may represent a logic high level and the deactivated state may represent a logic low level.

Therefore, the reset transistor 122 may be turned on in response to the activated reset control signal RX to reset the floating diffusion node FD. The reset operation may be performed by discharging the photo-charges stored in the floating diffusion node FD to the supply voltage VDD during the detection period DP. Since the transmission transistor 121 is turned off in response to the deactivated first and second transmission control signals TX1 and TX2 during the detection period DP, the photo-charges generated from the light-electron conversion unit 110 may be accumulated in the storage node SN.

As described above, the threshold voltages of the transmission transistors 121 in the unit pixels 101 of the image sensor 10 may be different. Therefore, an amount of the photo-charges accumulated in the storage node SN for a same incident light IL may be different between the unit pixels 101. This variation may cause a fixed pattern noise (FPN) in the image sensor 10.

Figure 4A:
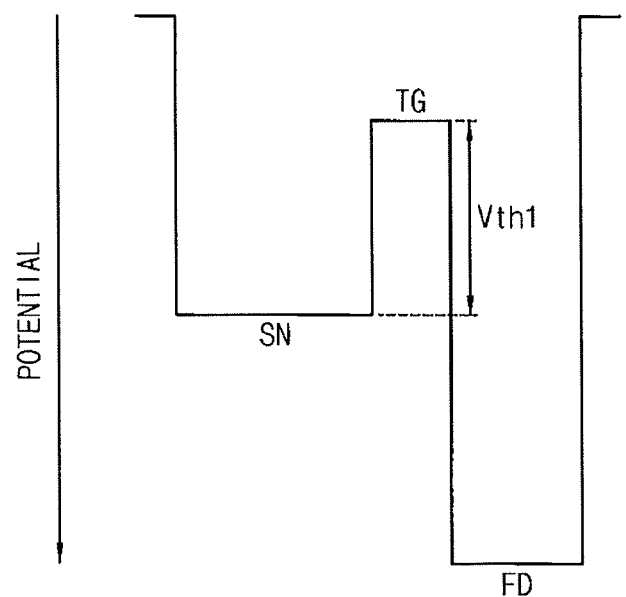
FIGS. 4A, 4B, 4C, 5A, 5B, and 5C describe differences in an amount of photo-charges accumulated in a storage node according to a threshold voltage of a transmission transistor in the unit pixel.
Figure 4B:
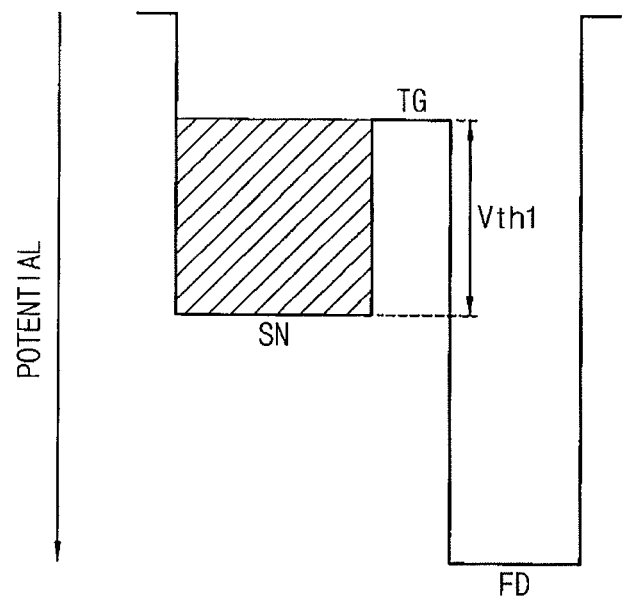
Figure 4C:
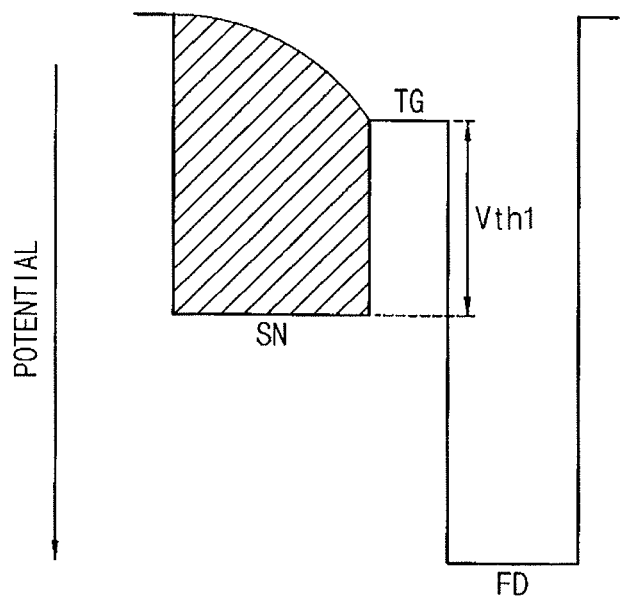
Figure 5A:
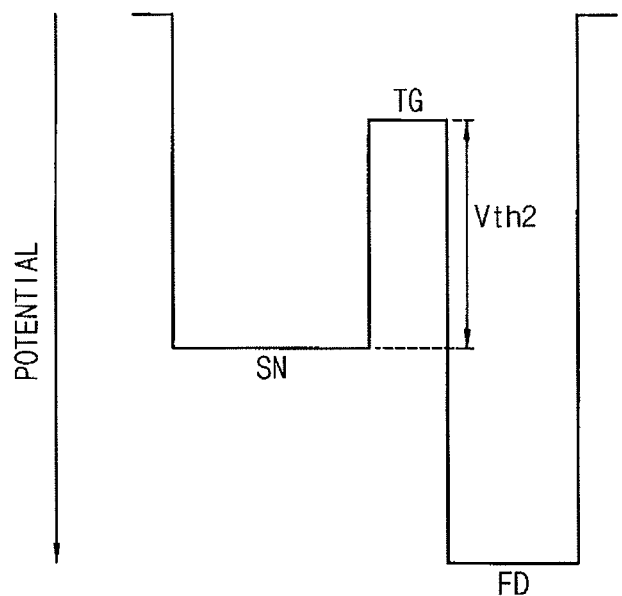
Figure 5B:
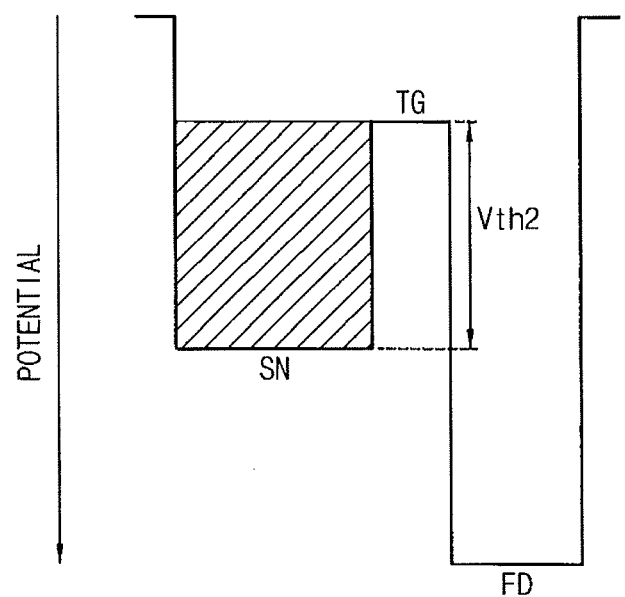
Figure 5C:
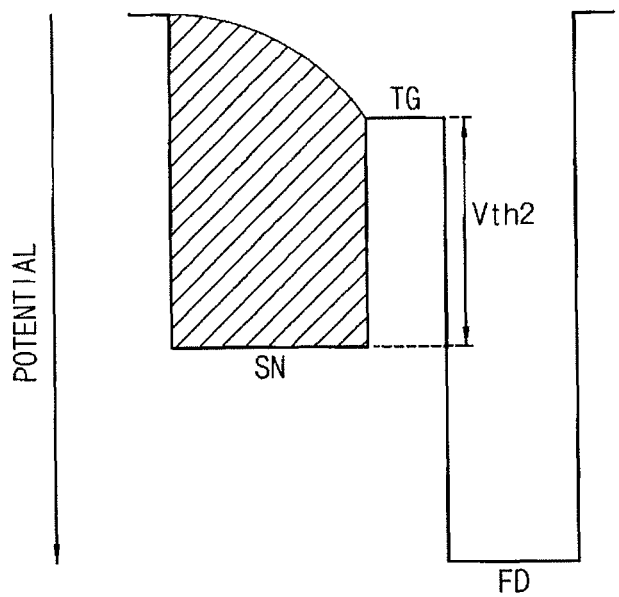

FIGS. 4A, 4B, 4C, 5A, 5B, and 5C describe differences in an amount of photo-charges accumulated in a storage node according to a threshold voltage of a transmission transistor in a unit pixel, such as in FIG. 2. More specifically, FIGS. 4A, 4B, and 4C illustrate the photo-charges accumulated in the storage node SN and electric potentials of a first unit pixel including the transmission transistor 121 having a relatively low threshold voltage. FIGS. 5A, 5B, and 5C illustrate the photo-charges accumulated in the storage node SN and electric potentials of a second unit pixel including the transmission transistor 121 having a relatively high threshold voltage. In FIGS. 4A, 4B, 4C, 5A, 5B, and 5C, electric potentials of the storage node SN, the gate TG of the transmission transistor 121, and the floating diffusion node FD are illustrated, and a dark area represents the photo-charges.

Referring to FIGS. 4A, 4B, and 4C, the transmission transistor 121 in the first unit pixel has a first threshold voltage Vth1. As illustrated in FIG. 4A, no photo-charge may be stored in the storage node SN at an initial stage. As illustrated in FIG. 4B, the amount of the photo-charges accumulated in the storage node SN may increase linearly as the illuminance of the incident light IL increases. As illustrated in FIG. 4C, after the photo-charges are accumulated in the storage node SN up to the first threshold voltage Vth1, the amount of the photo-charges accumulated in the storage node SN may increase logarithmically as the illuminance of the incident light IL increases.

Referring to FIGS. 5A, 5B, and 5C, the transmission transistor 121 in the second unit pixel has a second threshold voltage Vth2 higher than the first threshold voltage Vth1. As illustrated in FIG. 5A, no photo-charge may be stored in the storage node SN at an initial stage. As illustrated in FIG. 5B, the amount of photo-charges accumulated in the storage node SN may increase linearly as the illuminance of the incident light IL increases. As illustrated in FIG. 5C, after the photo-charges are accumulated in the storage node SN up to the second threshold voltage Vth2, the amount of the photo-charges accumulated in the storage node SN may increase logarithmically as the illuminance of the incident light IL increases.

That is, the illuminance at which the amount of the photo-charges accumulated in the storage node SN during the detection period DP changes at an increased rate from a linear rate to a logarithmic rate may vary according to a threshold voltage of the transmission transistor 121. Therefore, when the illuminance of the incident light IL is relatively low, the amount of the photo-charges accumulated in the storage node SN during the detection period DP for the same incident light IL may be the same in the first unit pixel and the second unit pixel. This is so even though the first unit pixel includes transmission transistor 121 having the first threshold voltage Vth1 and the second unit pixel includes transmission transistor 121 having the second threshold voltage Vth2 higher than the first threshold voltage V1.

However, when the illuminance of the incident light IL is relatively high, the amount of the photo-charges accumulated in the storage node SN during the detection period DP for the same incident light IL may be different between the first unit pixel and the second unit pixel. Therefore, if the signal generation unit 120 in each of the unit pixels 101 generates an analog signal based on a total amount of the photo-charges accumulated in the storage node SN during the detection period DP, the fixed pattern noise (FPN) may occur.

Figure 6:
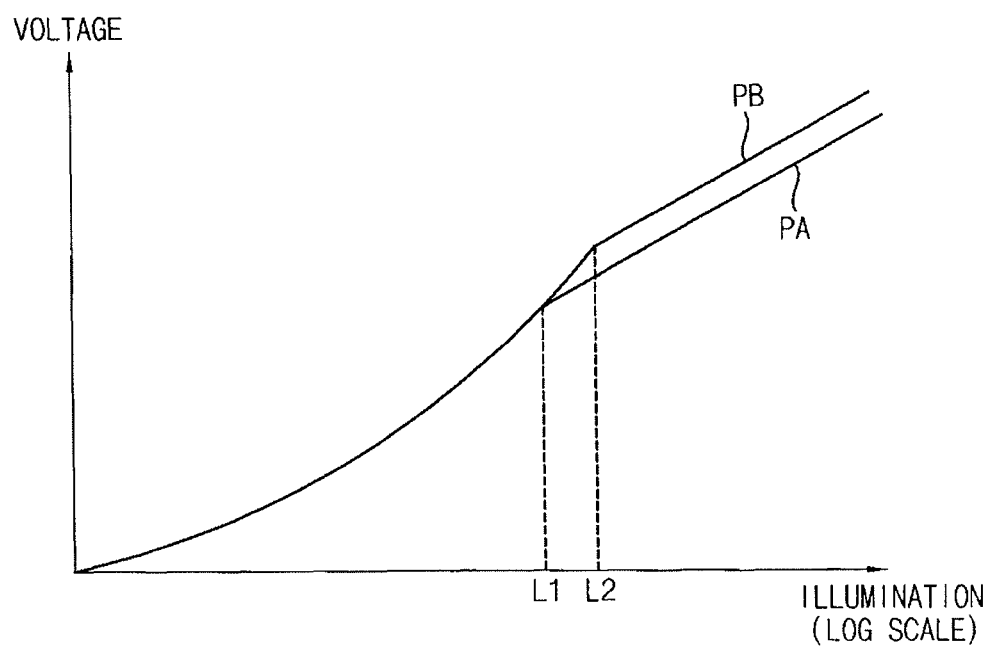
FIG. 6 describes fixed pattern noise (FPN) caused by a difference between threshold voltages of transmission transistors in unit pixels of an image sensor.

FIG. 6 describes fixed pattern noise (FPN) caused by a difference between threshold voltages of transmission transistors in unit pixels of FIG. 2. In FIG. 6, a first curve PA represents a relationship between the illuminance of the incident light IL and a magnitude of an analog signal generated based on a total amount of the photo-charges accumulated in the storage node SN of the first unit pixel during the detection period DP, in the first unit pixel. A second curve PB represents a relationship between the illuminance of the incident light IL and a magnitude of an analog signal generated based on a total amount of the photo-charges accumulated in the storage node SN in the second unit pixel during the detection period DP.

Referring to the first curve PA of FIG. 6, in the case of the first unit pixel, the magnitude of the analog signal increases linearly when the illuminance of the incident light IL is lower than or equal to a first illuminance L1. The magnitude of the analog signal increases logarithmically when the illuminance of the incident light IL is higher than the first illuminance L1.

Referring to the second curve PB of FIG. 6, in the case of the second unit pixel, the magnitude of the analog signal increase linearly when the illuminance of the incident light IL is lower than or equal to a second illuminance L2. The magnitude of the analog signal increases logarithmically when the illuminance of the incident light IL is higher than the second illuminance L2.

That is, a knee point of the analog signal for the illuminance of the incident light IL may vary according to the threshold voltage of the transmission transistor 121. Therefore, if the signal generation unit 120 in each of the unit pixels 101 generates the analog signal based on the total amount of the photo-charges accumulated in the storage node SN during the detection period DP, the fixed pattern noise (FPN) may occur when the illuminance of the incident light IL is higher than the first illuminance L1.

To reduce the fixed pattern noise (FPN), the control unit 400 in the image sensor 10 provides the first transmission control signal TX1 and the second transmission control signal TX2 to the gate of the transmission transistor 121, under conditions where the first and second transmission control signals TX1 and TX2 are activated consecutively during the output period OP.

Referring again to FIG. 3, the output period OP may include a first period P1, a second period P2, a third period P3, a fourth period P4, and a fifth period P5. During the output period OP, the control unit 400 may provide the row selection signal SEL having an activated state to the gate of the row selection transistor 124, and may provide the reset control signal RX having a deactivated state to the gate of the reset transistor 122. Therefore, the reset transistor 122 may be turned off in response to the deactivated reset control signal RX to disconnect the supply voltage VDD from the floating diffusion node FD. Since the row selection transistor 124 is turned on during the output period OP in response to the activated row selection signal SEL, the sensing transistor 123 may generate an output signal based on a voltage of the floating diffusion node FD and the row selection transistor 124 may pass the output signal.

During the second period P2 of the output period OP, the control unit 400 may provide the first transmission control signal TX1 at first voltage V1 to the gate of the transmission transistor 121. The transmission transistor 121 may weakly turn on during the second period P2 in response to the first transmission control signal TX1. As a result, a portion of the photo-charges accumulated in the storage node SN are transferred to the floating diffusion node FD. Therefore, the row selection transistor 124 may output the first analog signal AS1 during the third period P3. The first analog signal AS1 may have a magnitude corresponding to an amount of the photo-charges transferred to the floating diffusion node FD during the second period P2.

During the fourth period P4 of the output period OP, the control unit 400 may provide the second transmission control signal TX2 at the second voltage V2, which is higher than the first voltage V1, to the gate of the transmission transistor 121. The transmission transistor 121 may strongly turn on during the fourth period P4 in response to the second transmission control signal TX2. As a result, a remaining portion of the photo-charges in the storage node SN are transferred to the floating diffusion node FD. Therefore, the row selection transistor 124 may output the second analog signal AS2 during the fifth period. The second analog signal AS2 may have a magnitude corresponding to a total amount of the photo-charges transferred to the floating diffusion node FD during the second period P2 and the fourth period P4. In some example embodiments, the second voltage V2 may be the supply voltage VDD.

According to example embodiments, the row selection transistor 124 may output an analog signal representing a reset component during the first period P1 for a correlated double sampling (CDS) operation.

Figure 7A:
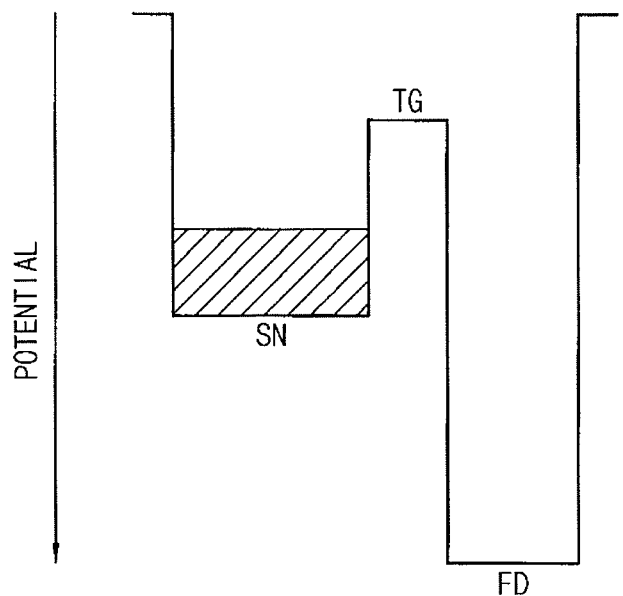
FIGS. 7A, 7B, and 7C describe operation of a unit pixel during an output period when illuminance of incident light is relatively low.
Figure 7B:
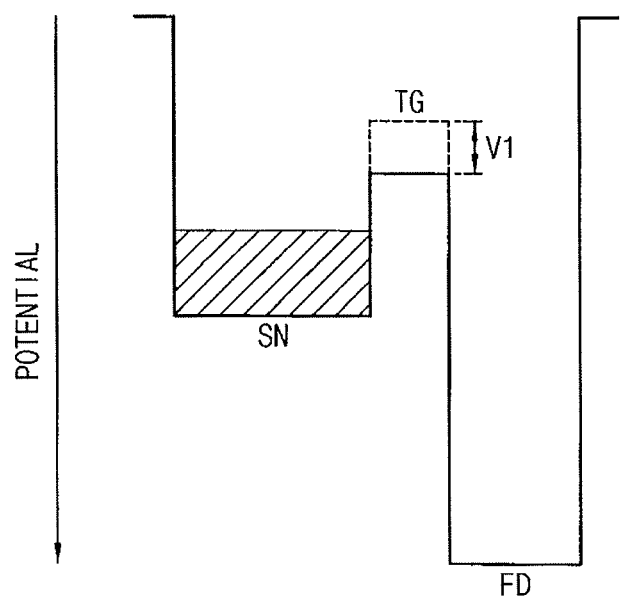
Figure 7C:
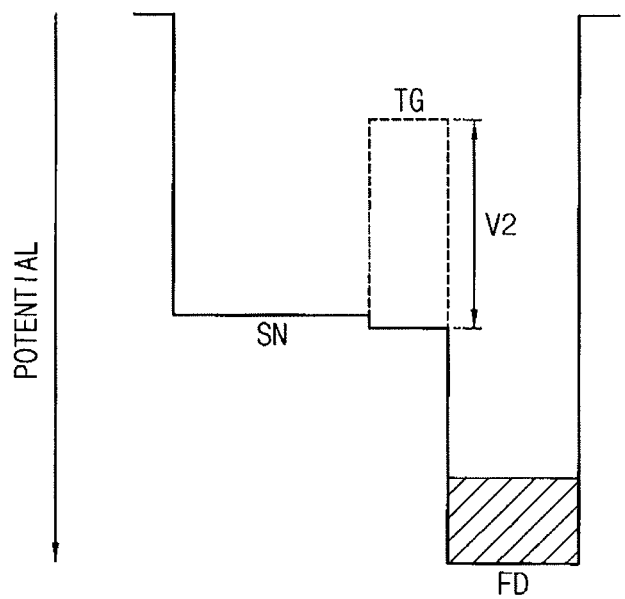
Figure 8A:
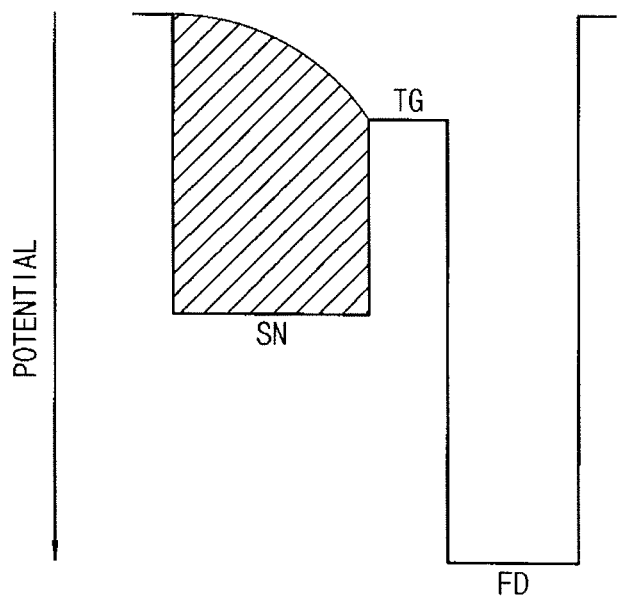
FIGS. 8A, 8B, and 8C describes operation of the unit pixel during an output period when illuminance of incident light is relatively high.
Figure 8B:
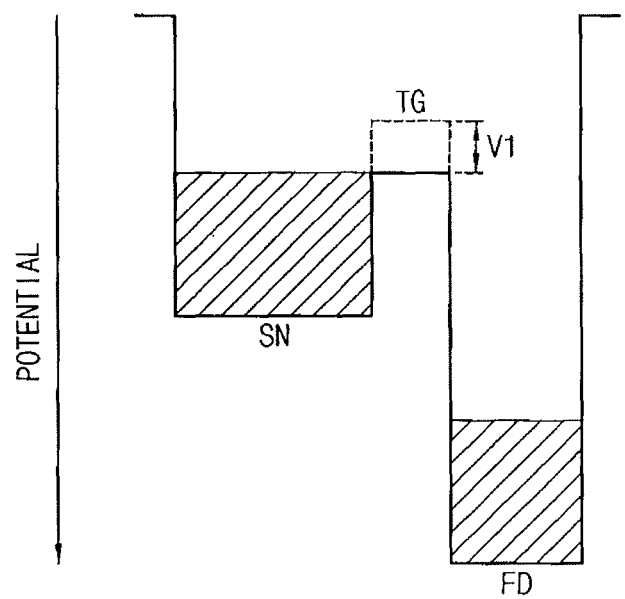
Figure 8C:
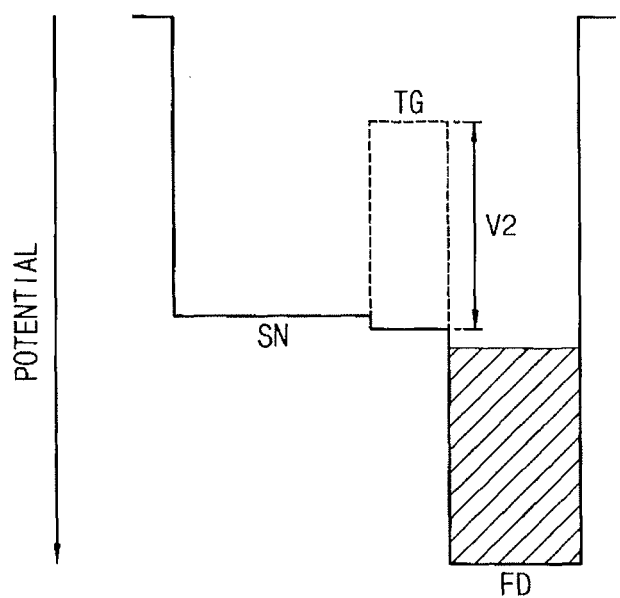

FIGS. 7A, 7B, and 7C describe operation of the unit pixel of FIG. 2 during an output period when an illuminance of incident light is relatively low. FIGS. 8A, 8B, and 8C describe operation of the unit pixel of FIG. 2 during an output period when an illuminance of incident light is relatively high. More specifically, FIGS. 7A and 8A, transfer of the photo-charges and electric potentials of unit pixel 101 are illustrated during the first period P1. In FIGS. 7B and 8B, transfer of the photo-charges and electric potentials of unit pixel 101 are illustrated during the second period P2. In FIGS. 7C and 8C, transfer of the photo-charges and electric potentials of unit pixel 101 are illustrated during the fourth period P4.

Referring to FIG. 7A, the amount of the photo-charges accumulated in the storage node SN during the detection period DP may be relatively small when the illuminance of the incident light IL is relatively low. Therefore, as illustrated in FIG. 7B, although the first transmission control signal TX1 at the first voltage V1 is applied to the gate TG of the transmission transistor 121 during the second period P2, no photo-charges may be transferred from the storage node SN to the floating diffusion node FD. As such, the magnitude of the first analog signal AS1 output from the row selection transistor 124 during the third period P3 may be substantially the same as a reset level.

As illustrated in FIG. 7C, since the second transmission control signal TX2 at the second voltage V2 is applied to the gate TG of the transmission transistor 121 during the fourth period P4, all of the photo-charges accumulated in the storage node SN during the detection period DP may be transferred to the floating diffusion node FD. Therefore, the magnitude of the second analog signal AS2 output from the row selection transistor 124 during the fifth period P5 may correspond to the total amount of the photo-charges accumulated in the storage node SN during the detection period DP.

Referring to FIG. 8A, the amount of the photo-charges accumulated in the storage node SN during the detection period DP may be relatively large when the illuminance of the incident light IL is relatively high. Therefore, as illustrated in FIG. 8B, since the first transmission control signal TX1 at the first voltage V1 is applied to the gate TG of the transmission transistor 121 during the second period P2, a portion of the photo-charges accumulated in the storage node SN during the detection period DP may be transferred to the floating diffusion node FD. As such, the magnitude of the first analog signal AS1 output from the row selection transistor 124 during the third period P3 may correspond to the amount of the portion of the photo-charges transferred from the storage node SN to the floating diffusion node FD during the second period P2.

As illustrated in FIG. 8C, since the second transmission control signal TX2 at the second voltage V2 is applied to the gate TG of the transmission transistor 121 during the fourth period P4, the remaining portion of the photo-charges remained in the storage node SN after the second period P2 may be transferred to the floating diffusion node FD. Therefore, the magnitude of the second analog signal AS2 output from the row selection transistor 124 during the fifth period P5 may correspond to the total amount of the photo-charges accumulated in the storage node SN during the detection period DP.

Figure 9:
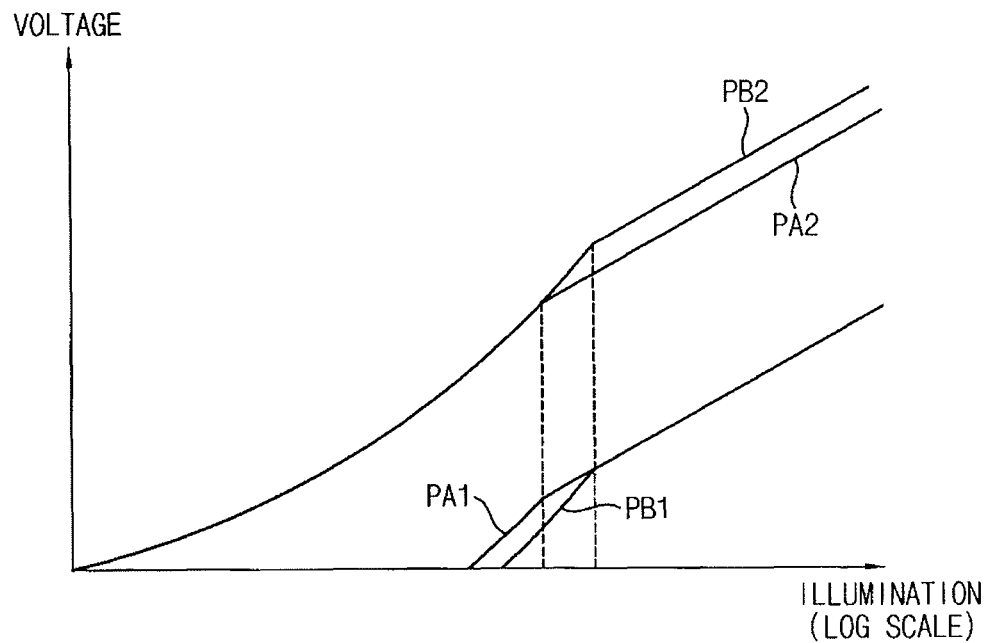
FIG. 9 is a graph representing a first analog signal and a second analog signal generated from the unit pixel based on illuminance of incident light.

FIG. 9 illustrates a first analog signal and a second analog signal generated from the unit pixel of FIG. 2 according to the illuminance of incident light. In FIG. 9, a third curve PA1 represents a relationship between the illuminance of the incident light IL and a magnitude of the first analog signal AS1 generated from the first unit pixel, which includes the transmission transistor 121 having a relatively low threshold voltage. The fourth curve PA2 represents a relationship between the illuminance of the incident light IL and a magnitude of the second analog signal AS2 generated from the first unit pixel. A fifth curve PB1 represents a relationship between the illuminance of the incident light IL and a magnitude of the first analog signal AS1 generated from the second unit pixel, which includes the transmission transistor 121 having a relatively high threshold voltage. A sixth graph PB2 represents a relationship between the illuminance of the incident light IL and a magnitude of the second analog signal AS2 generated from the second unit pixel.

As described above with reference to FIGS. 4A, 4B, 4C, 5A, 5B, and 5C, the threshold voltages of the transmission transistors 121 in the unit pixels 101 may be different. Therefore, when the illuminance of the incident light IL is relatively low and the amount of photo-charges accumulated in the storage node SN increases linearly, the total amount of the photo-charges accumulated in the storage node SN during the detection period DP for the same incident light IL may be the same in the unit pixels 101.

However, when the illuminance of the incident light IL is relatively high and the amount of photo-charges accumulated in the storage node SN increases logarithmically, the total amount of photo-charges accumulated in the storage node SN during the detection period DP for the same incident light IL may be different between the unit pixels 101.

As described above, the magnitude of the second analog signal AS2 may correspond to the total amount of the photo-charges accumulated in the storage node SN during the detection period DP. Therefore, as illustrated in the fourth curve PA2 and the sixth curve PB2 of FIG. 9, when the illuminance of the incident light IL is relatively low and the amount of photo-charges accumulated in the storage node SN increases linearly, the magnitudes of the second analog signals AS2 generated from unit pixels 101 for the same incident light IL may be the same.

However, when the illuminance of the incident light IL is relatively high and the amount of photo-charges accumulated in the storage node SN increases logarithmically, the magnitudes of the second analog signals AS2 generated from the unit pixels 101 for the same incident light IL may be different.

That is, the fixed pattern noise (FPN) may not be included in the second analog signal AS2 when the illuminance of the incident light IL is relatively low, and the fixed pattern noise (FPN) may be included in the second analog signal AS2 when the illuminance of the incident light IL is relatively high.

On the other hand, as described above with reference to FIGS. 3 and 8B, the transmission transistor 121 may weakly turn on during the second period P2 in response to the first transmission control signal TX1 at the first voltage V1. As a result, a portion of the photo-charges accumulated in the storage node SN are transferred to the floating diffusion node FD. Therefore, when the illuminance of the incident light IL is relatively high and the amount of the photo-charges accumulated in the storage node SN increases logarithmically, an amount of the portion of the photo-charges transferred from the storage node SN to the floating diffusion node FD during the second period P2 may be the same (or at some predetermined level) in each of the unit pixels 101.

As described above, the magnitude of the first analog signal AS1 may correspond to the amount of the portion of the photo-charges transferred from the storage node SN to the floating diffusion node FD during the second period P2. Therefore, as illustrated in the third curve PA1 and the fifth curve PB1 of FIG. 9, when the illuminance of the incident light IL is relatively high and the amount of the photo-charges accumulated in the storage node SN increases logarithmically, the magnitudes of the first analog signals AS1 generated from the unit pixels 101 for the same incident light IL may be same. That is, the fixed pattern noise (FPN) may not be included in the first analog signal AS1 when the illuminance of the incident light IL is relatively high.

Therefore, each of the selection units 210 may generate the image signal IM based on the second analog signal AS2 when the illuminance of the incident light IL is relatively low. Each of the selection units 210 may generate the image signal IM based on the first analog signal AS1 when the illuminance of the incident light IL is relatively high, such that the fixed pattern noise (FPN) of the image sensor 10 may be reduced or eliminated.

Figure 10:
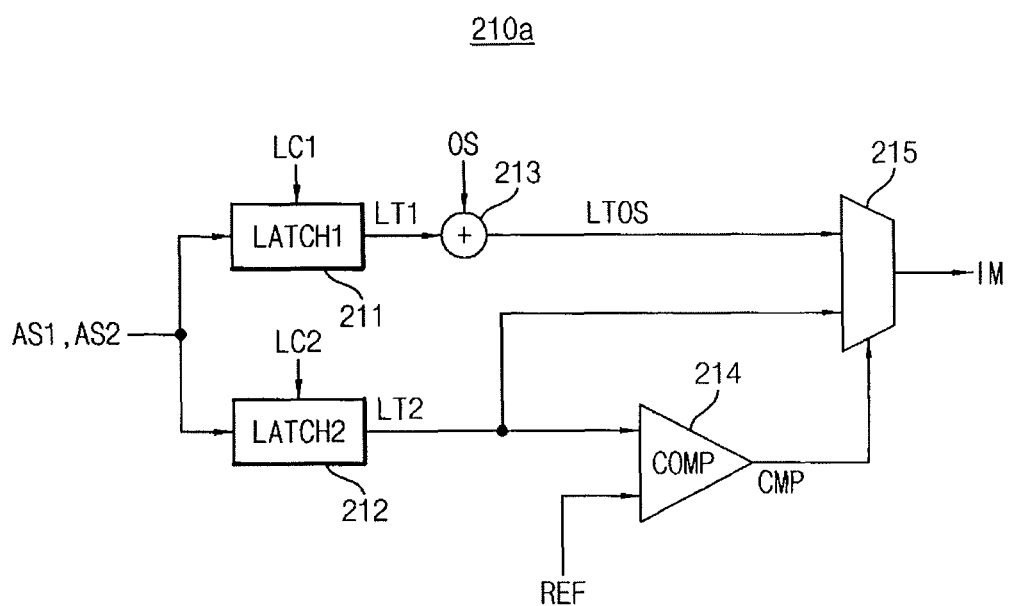
FIG. 10 illustrates an example of a selection unit in the image sensor.

FIG. 10 illustrates an example of a selection unit that may be included in the image sensor of FIG. 1. Referring to FIG. 10, a selection unit 210a may include a first latch unit 211, a second latch unit 212, a summing unit 213, a comparison unit COMP 214, and a multiplexer 215.

The first latch unit 211 may latch the first analog signal AS1 in response to a first latch control signal LC1.

The second latch unit 212 may latch the second analog signal AS2 in response to a second latch control signal LC2.

The first latch control signal LC1 and the second latch control signal LC2 may be provided from the control unit 400. The control unit 400 may provide the first latch control signal LC1 to the first latch unit 211 during the third period P3 of the output period OP, and provide the second latch control signal LC2 to the second latch unit 212 during the fifth period P5 of the output period OP.

The summing unit 213 may generate a sum signal LTOS by adding an output signal LT1 of the first latch unit 211 and an offset signal OS.

The comparison unit 214 may generate a comparison signal CMP having a first logic level when an output signal LT2 of the second latch unit 212 is smaller than or equal to a reference signal REF. The comparison unit 214 may generate the comparison signal CMP having a second logic level when the output signal LT2 of the second latch unit 212 is greater than the reference signal REF.

The multiplexer 215 may output the output signal LT2 of the second latch unit 212 as the image signal IM when the comparison signal CMP has the first logic level. The multiplexer 215 may output the sum signal LTOS as the image signal IM when the comparison signal CMP has the second logic level.

Therefore, the selection unit 210a of FIG. 10 may output the second analog signal AS2 as the image signal IM when the second analog signal AS2 is smaller than or equal to the reference signal REF. Also, the selection unit 210a may output a sum of the first analog signal AS1 and the offset signal OS as the image signal IM when the second analog signal AS2 is greater than the reference signal REF.

In some example embodiments, the reference signal REF and the offset signal OS may be provided from the control unit 400. In other example embodiments, the reference signal REF and the offset signal OS may be generated internally in the selection unit 210a.

Figure 11A:
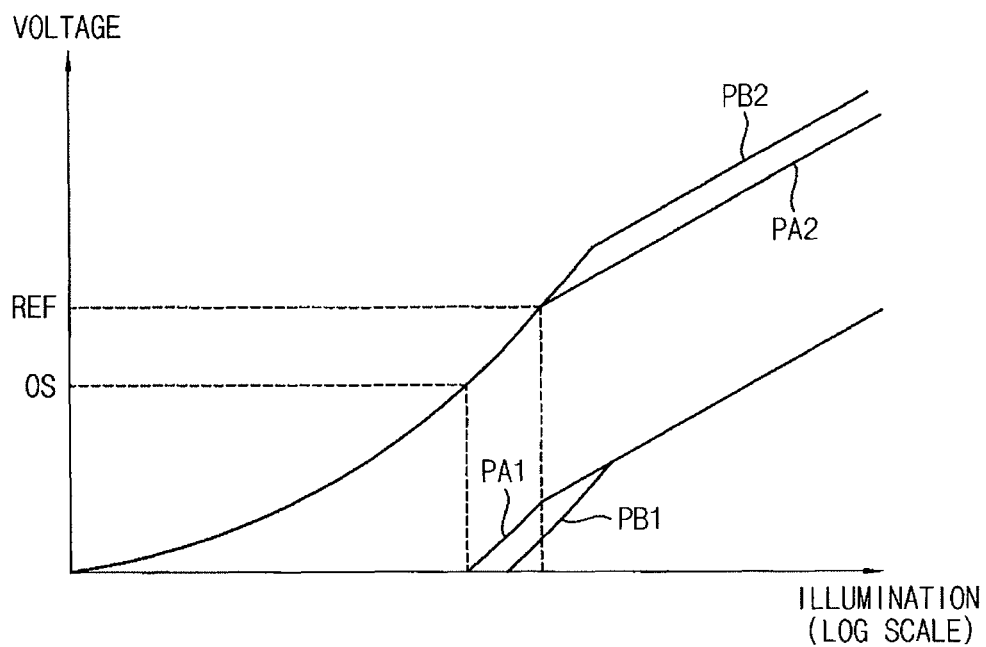
FIGS. 11A and 11B describe operation of a selection unit in FIG. 10.
Figure 11B:
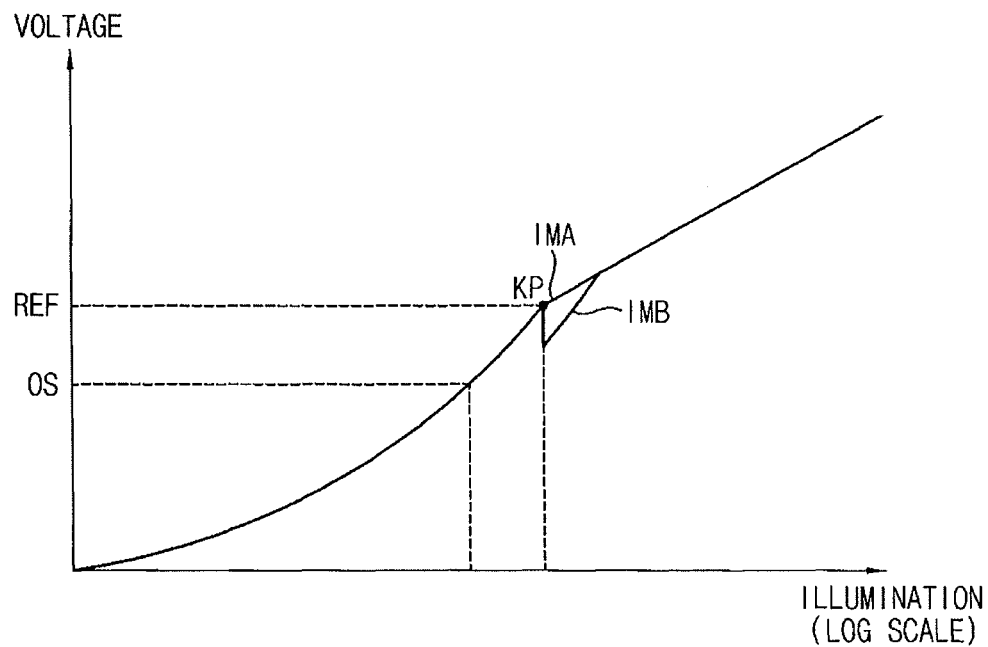

FIGS. 11A and 11B describe operation of a selection unit of FIG. 10. FIG. 11A represents a relationship between the illuminance of the incident light IL and magnitudes of the first analog signal AS1 and the second analog signal AS2 provided to the selection unit 210a. FIG. 11B represents a relationship between the illuminance of the incident light IL and a magnitude of the image signal IM outputted from the selection unit 210a.

In FIG. 11A, the third curve PA1 represents a relationship between the illuminance of the incident light IL and the magnitude of the first analog signal AS1 generated from the first unit pixel, which includes the transmission transistor 121 having a relatively low threshold voltage. The fourth curve PA2 represents a relationship between the illuminance of the incident light IL and the magnitude of the second analog signal AS2 generated from the first unit pixel.

The fifth graph PB1 represents a relationship between the illuminance of the incident light IL and the magnitude of the first analog signal AS1 generated from the second unit pixel, which includes the transmission transistor 121 having a relatively high threshold voltage. The sixth graph PB2 represents a relationship between the illuminance of the incident light IL and the magnitude of the second analog signal AS2 generated from the second unit pixel.

Referring to FIG. 11A, a magnitude of the reference signal REF may correspond to the magnitude of the second analog signal AS2 generated from a unit pixel at a knee point of the second analog signal AS2. In this case, the unit pixel may include transmission transistor 121 having a lowest threshold voltage among the unit pixels 101 included in the image sensor 10.

In addition, a magnitude of the offset signal OS may correspond to the magnitude of the second analog signal AS2 at a time when the first analog signal AS1 generated from the unit pixel starts to increase as an intensity of the incident light IL increases. In this case, the unit pixel includes transmission transistor 121 having a lowest threshold voltage among the unit pixels 101 included in the image sensor 10.

As described above, the selection unit 210a may output the second analog signal AS2 as the image signal IM when the second analog signal AS2 is smaller than or equal to the reference signal REF. The selection unit 210a may output the sum of the first analog signal AS1 and the offset signal OS as the image signal IM when the second analog signal AS2 is greater than the reference signal REF.

Therefore, a relationship between the illuminance of the incident light IL and the magnitude of the image signal IM output from the selection unit 210a coupled to the first unit pixel may be represented as a seventh curve IMA of FIG. 11B. In this case, the first unit pixel includes transmission transistor 121 having a relatively low threshold voltage. Also, a relationship between the illuminance of the incident light IL and the magnitude of the image signal IM output from the selection unit 210a coupled to the second unit pixel may be represented as an eighth graph IMB of FIG. 11B. In this case, the second unit pixel may include transmission transistor 121 having a relatively high threshold voltage.

Therefore, as illustrated in FIG. 11B, the fixed pattern noise (FPN) may occur in the image signal IM output from the selection unit 210a only around a knee point of the second analog signal AS2 for the illuminance of the incident light IL. As such, the fixed pattern noise (FPN) in the image signal IM output from the selection unit 210a may be effectively reduced.

Figure 12:
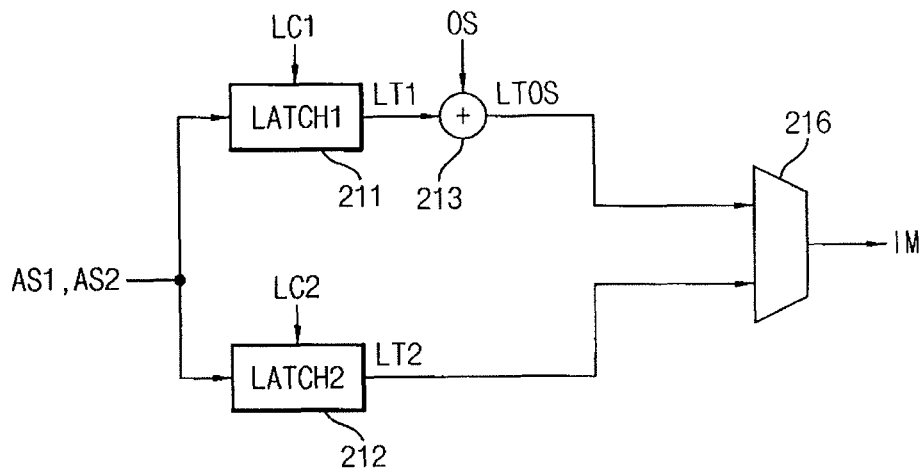
FIG. 12 illustrate another example of a selection unit in the image sensor.

FIG. 12 illustrates another example of a selection unit in an image sensor of FIG. 1. Referring to FIG. 12, a selection unit 210b may include the first latch unit 211, the second latch unit 212, the summing unit 213 and a multiplexer 216. The first latch unit 211 may latch the first analog signal AS1 in response to the first latch control signal LC1. The second latch unit 212 may latch the second analog signal AS2 in response to the second latch control signal LC2.

The first latch control signal LC1 and the second latch control signal LC2 may be provided from the control unit 400. The control unit 400 may provide the first latch control signal LC1 to the first latch unit 211 during the third period P3 of the output period OP. The control unit 400 may provide the second latch control signal LC2 to the second latch unit 212 during the fifth period P5 of the output period OP.

The summing unit 213 may generate the sum signal LTOS by adding the output signal LT1 of the first latch unit 211 and the offset signal OS.

The multiplexer 216 may output the smaller of the output signal LT2 of the second latch unit 212 and the sum signal LTOS as the image signal IM.

Therefore, the selection unit 210b of FIG. 12 may output the second analog signal AS2 as the image signal IM when the second analog signal AS2 is smaller than or equal to a sum of the first analog signal AS1 and the offset signal OS. The selection unit 210b may output the sum of the first analog signal AS1 and the offset signal OS as the image signal IM when the second analog signal AS2 is greater than the sum of the first analog signal AS1 and the offset signal OS.

In some example embodiments, the offset signal OS may be provided from the control unit 400. In other example embodiments, the offset signal OS may be generated internally in the selection unit 210b. While the selection unit 210a of FIG. 10 operates using the reference signal REF and the offset signal OS, the selection unit 210b of FIG. 12 may operate using the offset signal OS.

Figure 13A:
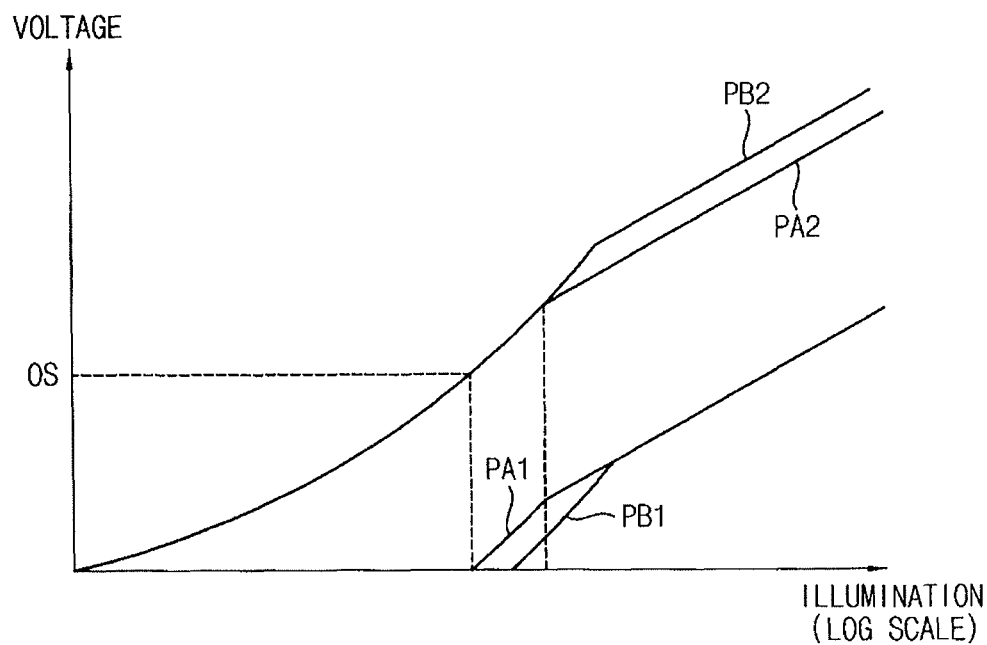
FIGS. 13A and 13B describe operation of a selection unit in FIG. 12.
Figure 13B:
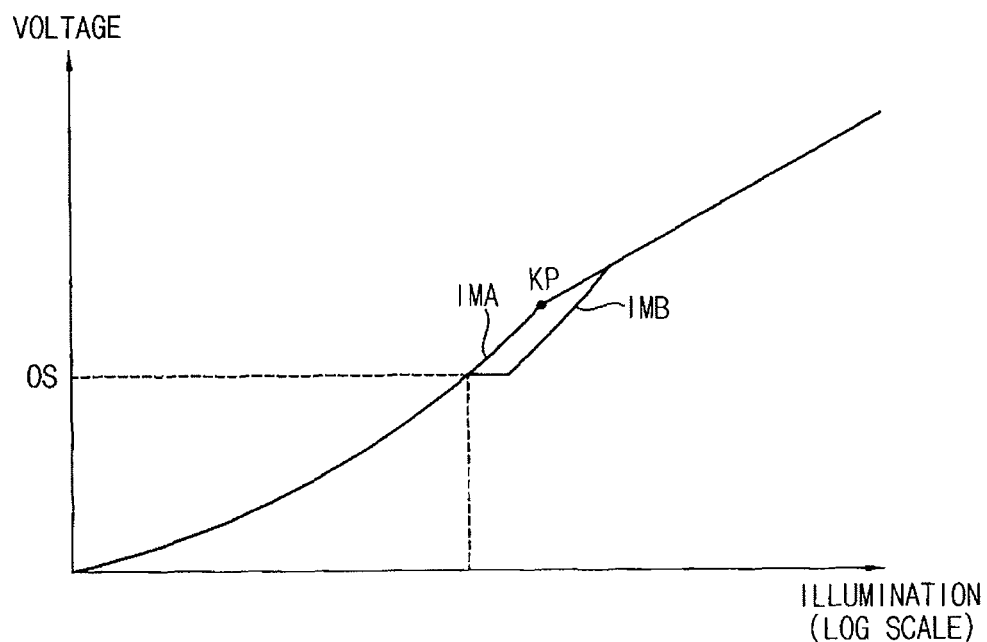

FIGS. 13A and 13B describes operation of a selection unit of FIG. 12. FIG. 13A represents a relationship between the illuminance of the incident light IL and magnitudes of the first analog signal AS1 and the second analog signal AS2 provided to the selection unit 210b. FIG. 13B represents a relationship between the illuminance of the incident light IL and a magnitude of the image signal IM outputted from the selection unit 210b.

In FIG. 13A, the third curve PA1 represents a relationship between the illuminance of the incident light IL and the magnitude of the first analog signal AS1 generated from the first unit pixel, which includes the transmission transistor 121 having a relatively low threshold voltage. The fourth curve PA2 represents a relationship between the illuminance of the incident light IL and the magnitude of the second analog signal AS2 generated from the first unit pixel.

The fifth curve PB1 represents a relationship between the illuminance of the incident light IL and the magnitude of the first analog signal AS1 generated from the second unit pixel, which includes the transmission transistor 121 having a relatively high threshold voltage. The sixth graph PB2 represents a relationship between the illuminance of the incident light IL and the magnitude of the second analog signal AS2 generated from the second unit pixel.

Referring to FIG. 13A, a magnitude of the offset signal OS may correspond to the magnitude of the second analog signal AS2 at a time when the first analog signal AS1 generated from a unit pixel starts to increase as the intensity of the incident light IL increases. In this case, the unit pixel includes transmission transistor 121 having a lowest threshold voltage among the unit pixels 101 included in the image sensor 10.

As described above, the selection unit 210b may output the second analog signal AS2 as the image signal IM when the second analog signal AS2 is smaller than or equal to the sum of the first analog signal AS1 and the offset signal OS. The selection unit 210b may output the sum of the first analog signal AS1 and the offset signal OS as the image signal IM when the second analog signal AS2 is greater than the sum of the first analog signal AS1 and the offset signal OS.

Therefore, a relationship between the illuminance of the incident light IL and the magnitude of the image signal IM output from the selection unit 210b coupled to the first unit pixel may be represented as a ninth curve IMA of FIG. 13B. In this case, the first unit pixel includes transmission transistor 121 having a relatively low threshold voltage. The relationship between the illuminance of the incident light IL and the magnitude of the image signal IM output from the selection unit 210b coupled to the second unit pixel may be represented as a tenth curve IMB of FIG. 13B. In this case, the second unit pixel includes transmission transistor 121 having a relatively high threshold voltage.

Therefore, as illustrated in FIG. 13B, fixed pattern noise (FPN) may occur in the image signal IM output from the selection unit 210b only around a knee point of the second analog signal AS2. As such, the fixed pattern noise in the image signal IM output from the selection unit 210b may be effectively reduced.

In operation, the selection circuit 200 generates the image signal IM based on one of the first analog signal AS1 or the second analog signal AS2 provided from the pixel array 100. The analog-digital conversion unit 300 converts the image signal IM from the selection circuit 200 to the digital signal DS in FIG. 1. According to other example embodiments, the analog-digital conversion unit 300 may convert the first analog signal AS1 and the second analog signal AS2 from pixel array 100 to a first digital signal and a second digital signal, respectively. Also, the selection circuit 200 may generate a digital image signal based on one of the first digital signal or the second digital signal provided from the analog-digital conversion unit 300.

Figure 14:
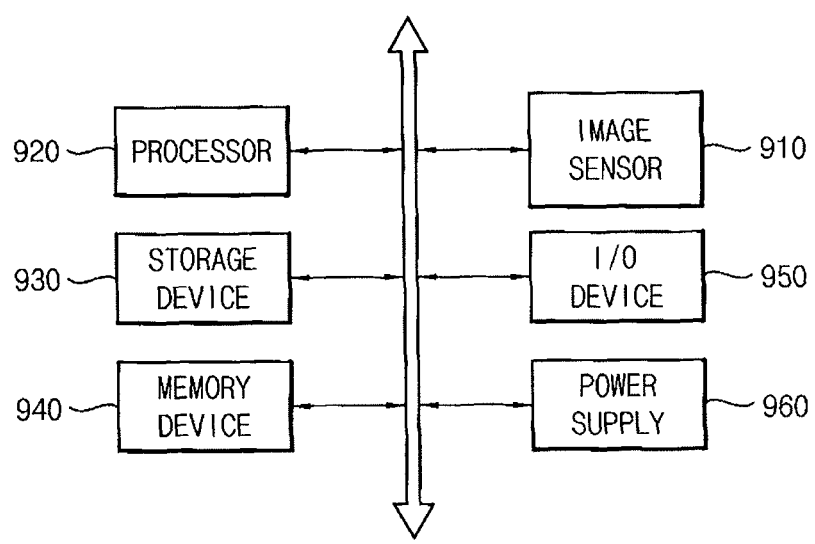
FIG. 14 illustrates an embodiment of a computing system.

FIG. 14 illustrates an embodiment of a computing system which includes an image sensor according to one or more of the aforementioned embodiments. Referring to FIG. 14, a computing system 900 may include an image sensor 910, a processor 920, and a storage device 930. The image sensor 910 may generate a digital signal corresponding to incident light. The storage device 930 may store the digital signal. The processor 920 may control operations of the image sensor 910 and the storage device 930.

The computing system 900 may further include a memory device 940, an input/output device 950, and a power supply 960. The computing system 900 may further include one or more ports that communicate with a video card, a sound card, a memory card, a universal serial bus (USB) device, and/or other electronic devices.

The processor 920 may perform various calculations or tasks. According to some embodiments, the processor 920 may be a microprocessor or a CPU. The processor 920 may communicate with the storage device 930, the memory device 940, and the input/output device 950 via an address bus, a control bus, and/or a data bus. In some example embodiments, the processor 920 may be coupled to an extended bus such as, for example, a peripheral component interconnection (PCI) bus.

The storage device 930 may include a non-volatile memory device such as a flash memory device, a solid state drive (SSD), a hard disk drive (HDD), a compact disk read-only memory (CD-ROM) drive, etc.

The memory device 940 may store data required for an operation of the electronic device 900. The memory device 940 may be a dynamic random access memory (DRAM), a static random access memory (SRAM), or a non-volatile memory, such as an erasable programmable read-only memory (EPROM), an electrically erasable programmable read-only memory (EEPROM), a flash memory, etc.

The input/output device 950 may include a touch screen, a keypad, a keyboard, a mouse, a printer, a display device, etc. The power supply 960 may supply operational power.

The image sensor 910 may be connected to the processor 920 through one or more of the aforementioned buses or other communication links to communicate with the processor 920.

The image sensor 901 includes a light-electron conversion unit, a signal generation unit, a selection unit, and an analog-digital conversion unit. The light-electron conversion unit generates photo-charges in response to the incident light. During a detection period, the signal generation unit accumulates the photo-charges generated from the light-electron conversion unit in a storage node. During an output period, the signal generation unit generates a first analog signal and a second analog signal in response to a first transmission control signal and a second transmission control signal, respectively based on an amount of the photo-charges accumulated in the storage node. The first and second transmission control signals may be activated or applied consecutively. The selection unit generates an image signal based on one of the first analog signal and the second analog signal. The analog-digital conversion unit converts the image signal to the digital signal.

The image sensor 910 may be embodied with the image sensor 10 of FIG. 1. A structure and an operation of the image sensor 10 of FIG. 1 are described above with reference to FIGS. 1 to 13B.

The image sensor 910 may be packaged in various forms, such as package on package (PoP), ball grid arrays (BGAs), chip scale packages (CSPs), plastic leaded chip carrier (PLCC), plastic dual in-line package (PDIP), die in waffle pack, die in wafer form, chip on board (COB), ceramic dual in-line package (CERDIP), plastic metric quad flat pack (MQFP), thin quad flat pack (TQFP), small outline IC (SOIC), shrink small outline package (SSOP), thin small outline package (TSOP), system in package (SIP), multi chip package (MCP), wafer-level fabricated package (WFP), or wafer-level processed stack package (WSP).

According to example embodiments, the image sensor 910 may be integrated with the processor 920 in one chip, or the image sensor 910 and the processor 920 may be implemented as separate chips.

The computing system 900 may be any computing system using an image sensor. For example, the computing system 900 may include a digital camera, a mobile phone, a smart phone, a portable multimedia player (PMP), a personal digital assistant (PDA), etc.

FIG. 15 illustrates an embodiment of an interface used in the computing system of FIG. 14. Referring to FIG. 15, a computing system 1000 may be implemented by a data processing device (e.g., a cellular phone, a personal digital assistant, a portable multimedia player, a smart phone, etc.) that uses or supports, for example, a mobile industry processor interface (MIPI) interface. The computing system 1000 may include an application processor 1110, an image sensor 1140, a display device 1150, etc.

A CSI host 1112 of the application processor 1110 may perform serial communications with a CSI device 1141 of the image sensor 1140 via a camera serial interface (CSI). In some embodiments, the CSI host 1112 may include a deserializer (DES), and the CSI device 1141 may include a serializer (SER). A DSI host 1111 of the application processor 1110 may perform a serial communication with a DSI device 1151 of the display device 1150 via a display serial interface (DSI). In some example embodiments, the DSI host 1111 may include a serializer (SER), and the DSI device 1151 may include a deserializer (DES).

The computing system 1000 may further include a radio frequency (RF) chip 1160 performing a communication with the application processor 1110. A physical layer (PHY) 1113 of the computing system 1000 and a physical layer (PHY) 1161 of the RF chip 1160 may perform data communications based on a MIPI DigRF. The application processor 1110 may further include a DigRF MASTER 1114 that controls the data communications according to the MIPI DigRF of the PHY 1161, and the RF chip 1160 may further include a DigRF SLAVE 1162 controlled by the DigRF MASTER 1114.

The computing system 1000 may further include a global positioning system (GPS) 1120, a storage 1170, a MIC 1180, a DRAM device 1185, and a speaker 1190. In addition, the computing system 1000 may perform communications using an ultra wideband (UWB) 1210, a wireless local area network (WLAN) 1220, a worldwide interoperability for microwave access (WIMAX) 1230, etc. However, the structure and the interface of the computing system 1000 are not limited thereto.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. An image sensor, comprising:
a light-electron converter to generate photo-charges from incident light;
a signal generator to accumulate the photo-charges from the light-electron converter in a storage node during a detection period, and to generate a first analog signal and a second analog signal based on a first transmission control signal and a second transmission control signal, respectively, during an output period; and
a selector to generate an image signal based on one of the first analog signal or the second analog signal, wherein the first analog signal and the second analog signal are generated based on an amount of the photo-charges accumulated in the storage node and wherein the second transmission control signal is applied after the first transmission control signal in non-overlapping periods during the output period.

2. The image sensor as claimed in claim 1, wherein:
the first transmission control signal is at first voltage, and
the second transmission control signal is at a second voltage greater than the first voltage.

3. The image sensor as claimed in claim 2, wherein:
the signal generator is to generate the first analog signal based on a partial amount of the photo-charges accumulated in the storage node in response to the first transmission control signal, and
the signal generator is to generate the second analog signal based on a total amount of the photo-charges accumulated in the storage node in response to the second transmission control signal.

4. The image sensor as claimed in claim 3, wherein the selector is to output:
the second analog signal as the image signal when the second analog signal is smaller than or equal to a reference signal, and
a sum of the first analog signal and an offset signal as the image signal when the second analog signal is greater than the reference signal.

5. The image sensor as claimed in claim 4, wherein a magnitude of the offset signal corresponds to a magnitude of the second analog signal at a time when the first analog signal starts to increase as an intensity of the incident light increases.

6. The image sensor as claimed in claim 3, wherein the selector includes:
a first latch to latch the first analog signal in response to a first latch control signal;
a second latch to latch the second analog signal in response to a second latch control signal;
a summer to generate a sum signal by adding an output signal of the first latch and an offset signal;
a comparator to generate a comparison signal having a first logic level when an output signal of the second latch is less than or equal to a reference signal, and to generate the comparison signal having a second logic level when the output signal of the second latch is greater than the reference signal; and
a multiplexer to output the output signal of the second latch as the image signal when the comparison signal has the first logic level, and to output the sum signal as the image signal when the comparison signal has the second logic level.

7. The image sensor as claimed in claim 3, wherein the selector outputs:
the second analog signal as the image signal when the second analog signal is less than or equal to a sum of the first analog signal and an offset signal, and
the sum of the first analog signal and the offset signal as the image signal when the second analog signal is greater than the sum of the first analog signal and the offset signal.

8. The image sensor as claimed in claim 3, wherein the selector includes:
a first latch to latch the first analog signal in response to a first latch control signal;
a second latch to latch the second analog signal in response to a second latch control signal;
a summer to generate a sum signal by adding an output signal of the first latch and an offset signal; and
a multiplexer to output a smaller of an output signal of the second latch and the sum signal as the image signal.

9. The image sensor as claimed in claim 2, wherein the signal generator includes:
a transmission transistor including a source coupled to the storage node, a drain coupled to a floating diffusion node, and a gate coupled to receive the first transmission control signal and the second transmission control signal;
a reset transistor including a source coupled to the floating diffusion node, a drain coupled to a supply voltage, and a gate receiving a reset control signal;
a sensing transistor including a source, a drain coupled to the supply voltage, and a gate coupled to the floating diffusion node; and
a row selection transistor including a drain coupled to the source of the sensing transistor, a gate receiving a row selection signal, and a source outputting the first analog signal and the second analog signal.

10. The image sensor as claimed in claim 9, wherein:
the reset control signal is activated and the reset transistor is turned on to reset the floating diffusion node, the floating diffusion node reset by discharging the photo-charges stored in the floating diffusion node to the supply voltage during the detection period, and the reset control signal is deactivated and the reset transistor is turned off during the output period.

11. The image sensor as claimed in claim 9, wherein, during the output period, the transmission transistor turns on at a first strength in response to the first transmission control signal to transfer a portion of the photo-charges accumulated in the storage node to the floating diffusion node, and wherein the transmission transistor turns on at a second strength in response to the second transmission control signal to transfer a remaining portion of the photo-charges in the storage node to the floating diffusion node, and wherein the second strength is greater than the first strength.

12. The image sensor as claimed in claim 11, wherein, during the output period, the sensing transistor generates an output signal based on a voltage of the floating diffusion node and the row selection transistor turns on in response to the row selection signal to pass the output signal.

13. The image sensor as claimed in claim 11, wherein:
the row selection transistor turns on during the output period to output the first analog signal having a magnitude corresponding to an amount of the photo-charges stored in the floating diffusion node after the first transmission control signal is activated, and
the row selection transistor outputs the second analog signal having a magnitude corresponding to an amount of the photo-charges stored in the floating diffusion node after the second transmission control signal is activated.

14. The image sensor as claimed in claim 1, further comprising:
an analog-to-digital converter to convert the image signal to a digital signal; and
a controller to control operations of the signal generator, the selector, and the analog-to-digital converter.

15. A computing system, comprising:
an image sensor to generate a digital signal based on incident light;
a storage area to store the digital signal; and
a processor to control operations of the image sensor and storage area, wherein the image sensor includes:
a light-electron converter to generate photo-charges in response to the incident light;
a signal generator to accumulate the photo-charges generated from the light-electron converter in a storage node during a detection period, and to generate a first analog signal and a second analog signal in response to a first transmission control signal and a second transmission control signal, respectively, during an output period;

a selector to generate an image signal based on one of the first analog signal and the second analog signal; and an analog-to-digital converter to convert the image signal to the digital signal, wherein the first analog signal and the second analog signal are generated based on amounts of the photo-charges accumulated in the storage node, and wherein the second transmission control signal is applied or activated before first transmission control signal in non-overlapping periods of the output period.

16. An image sensor, comprising:
a converter to generate photo-charges from incident light;
a storage node to accumulate a first amount of the photo-charges during a first period and a second amount of the photo-charges during a non-overlapping second period;
a floating diffusion node to receive the photo-charges accumulated in the storage node; and
a selector to generate an image signal based on a first analog signal and a second analog signal, the first analog signal to be generated based on a first amount of photo-charges transferred from the storage node to the floating diffusion node during the first period, and the second analog signal to be generated based on a second amount of photo-charges transferred from the storage node to the floating diffusion node during the second period, wherein the first amount of photo-charges are accumulated in the storage node at a first rate and the second amount of photo-charges are accumulated in the storage node at a second rate.

17. The image sensor as claimed in claim 16, wherein the first rate is greater than the second rate.

18. The image sensor as claimed in claim 17, wherein:
the first rate is a linear rate, and
the second rate is a logarithmic rate.

19. The image sensor as claimed in claim 16, further comprising:
a transmission switch,
wherein the first amount of photo-charges are transferred from the storage node to the floating diffusion node when the transmission switch is operating at a first strength and the second amount of photo-charges are transferred from the storage node to the floating diffusion node when the transmission switch is operating at a second strength different from the first strength.

20. The image sensor as claimed in claim 19, wherein the second strength is greater than the first strength.

* * * * *